United States Patent Office 3,090,229
Patented May 21, 1963

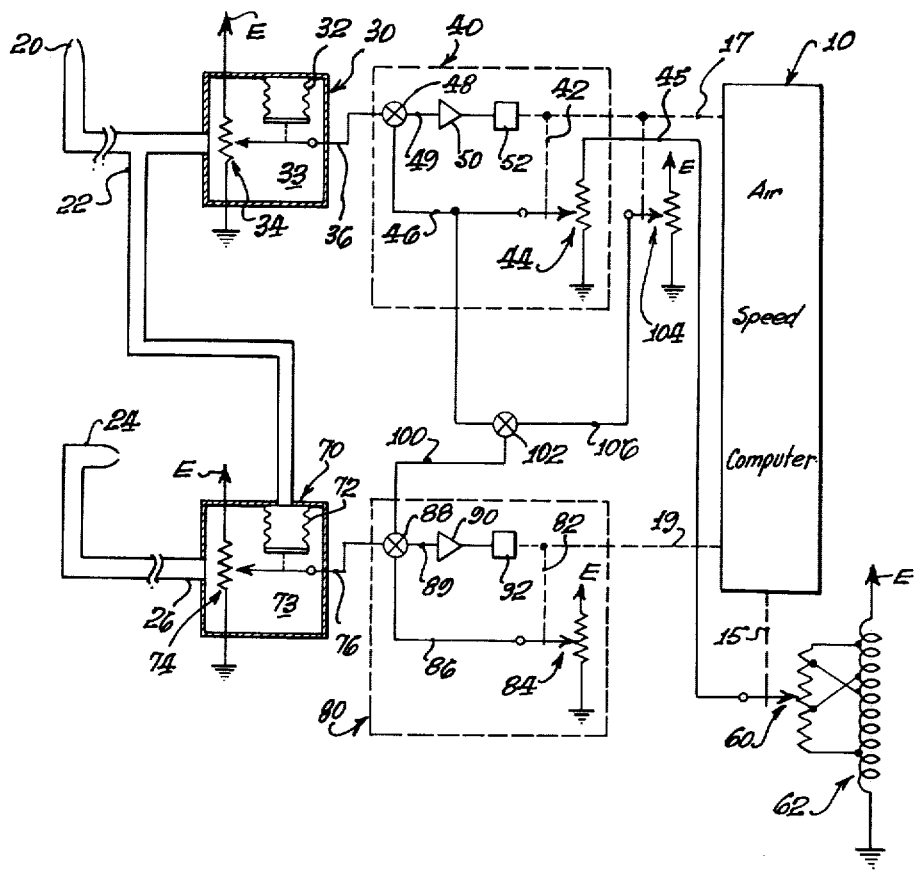

3,090,229
STATIC DEFECT COMPENSATION
Robert Charles Howard, Costa Mesa, Calif., assignor to Giannini Controls Corporation, Pasadena, Calif., a corporation of New York
Filed Sept. 8, 1959, Ser. No. 838,701
4 Claims. (Cl. 73—182)

This invention has to do generally with the development of a signal or other indication representing static pressure.

More particularly, the invention is concerned with the correction of indicated static pressure, as derived from a static orifice on a moving vehicle to eliminate the so-called static defect which is commonly associated with such orifices.

A primary object of the invention is to provide economical and effective means for deriving from the indicated static pressure a corrected signal that represents the true static pressure, wherein the static defect has been substantially fully compensated.

The invention further provides particularly convenient and effective mechanism for deriving from the indicated static and total pressures, as typically obtained from static and Pitot orifices, a signal that represents true differential pressure, corrected for the static defect that is typically present in the indicated static pressure.

The invention is particularly useful for supplying input signals representing static and differential pressures to a system for computing airspeed.

The static defect depends in a known manner primarily on Mach number. Hence my system for correcting static defect utilizes an input signal that represents Mach number at least sufficiently accurately for the purpose at hand. In actual practice, only a negligible error ordinarily results if that input signal represents true airspeed, rather than Mach number. It is therefore ordinarily satisfactory, when the overall system already includes either a Machmeter or a true airspeed computer, to utilize the airspeed signal that is at hand. When airspeed must be computed expressly to provide the needed input signal to my compensating system, I prefer that the input signal represent Mach number.

A full understanding of the invention and of its further objects and advantages will be had from the following description of an illustrative embodiment, of which description the accompanying drawing forms a part. The particulars of that description are intended only as illustration, and not as a limitation upon the scope of the invention.

The single FIGURE is a schematic drawing representing an illustrative embodiment of my invention, whereby control signals representing indicated static and differential pressures are substantially wholly corrected for static defect in a convenient and economical manner.

In the figure, the rectangle 10 represents schematically an airspeed computer of any usual type, having mechanical static and differential pressure inputs 17 and 19, respectively; and having a mechanical output 15 which represents the airspeed corresponding to those inputs. Computer 10 may compute either Mach number or true airspeed. The temperature sensitive means, if any, by which output 15 is corrected for ram temperature, may be considered to be contained within computer 10.

A static orifice of conventional type is represented schematically at 20, supplying to pressure conduit 22 a pressure equal to the indicated static pressure. The difference between that pressure and the true static pressure is known as the static defect for the particular type of orifice 20, and depends in a known manner primarily upon Mach number. The relatively slight dependence of static defect upon angle of attack is negligible for present purposes. A Pitot orifice is represented schematically at 24, and supplies to the conduit 26 a pressure equal to the dynamic or total pressure $P_t$, which is also known as the Pitot pressure.

A static pressure transducer is represented at 30, comprising an evacuated pressure responsive capsule 32 drivingly connected to the brush of a potentiometer 34 and contained in a chamber 33 which is open to static pressure conduit 32. The winding of potentiometer 34 is typically connected between ground and a source of reference potential E. The voltage signal tapped by the potentiometer brush on the line 36 is then some definite function of the indicated static pressure, and constitutes a voltage signal representing that pressure. A servo followup system of generally conventional type is represented at 40, comprising an output static pressure member, typically a shaft, represented schematically at 42; and a dividing mechanism shown as the balance potentiometer 44. The brush of potentiometer 44 is driven with shaft 42 and its winding is connected between ground and a source of reference potential comprising the line 45. The voltage tapped on the line 46 by the potentiometer brush is compared with the voltage on line 36 by the voltage comparison device represented schematically at 48, which may be of any suitable conventional type. The resulting difference voltage is supplied via line 49 to the servo amplifier 50, which controls servo motor 52. Motor 52 drives shaft 42 in such a way as to maintain balance between the voltage signals at 36 and 46. The shaft position, for the system so far described, would thus represent directly the value of the voltage signal from transducer 30. If the potentiometers 34 and 44 are linear and are linearly driven, and if the reference voltages supplied to their windings are constant voltages, as is normally the case in conventional follow-up systems of this general type, then the position of shaft 42 is typically directly proportional to the value of the indicated static pressure.

In accordance with the present invention, however, the reference voltage supplied to potentiometer 44 is caused to vary in a predetermined manner under control of the output 15 of airspeed computer 10. The reference voltage thus acts as a control signal. That is accomplished in the present illustrative system by means of a suitably shaped potentiometer represented schematically at 60, the brush of which is connected to line 45 and is driven by airspeed output shaft 15. Shaping of the winding of potentiometer 60 may be supplemented by connecting selected points of its winding to spaced taps on the winding of an auto transformer 62, which is connected between ground and a source of alternating current reference potential E. The combined action of potentiometer 60 and transformer 62 is designed, by application of known electrical principles, to produce a control signal on line 45 that varies with the airspeed and is proportional to the known ratio of the indicated static pressure to the true static pressure for each value of the airspeed. When the reference voltage supplied to potentiometer 44 of servo control 40 is caused to vary in that manner, it has the result that, if static pressure shaft 42 is considered to represent true static pressure, the voltage developed on line 46 represents the corresponding indicated static pressure. Both the signals supplied to comparison means 48 then represent indicated static pressure. The servo action is therefore such that its output shaft 42 does, in fact, represent true static pressure.

That servo action may be described alternatively in the following way: The voltage tapped on line 46 from potentiometer 44 equals the product of the reference voltage by the brush position. That position is driven by servo followup system 40 in such a way as to maintain the tapped voltage equal to the indicated static pressure signal on line 36. With the potentiometer reference voltage proportional to the ratio defined above, the tapped voltage can represent indicated static pressure only if the brush position corresponds to true static pressure.

Hence, a correct measure of static pressure, corrected for static defect, can be obtained for control of airspeed computer 10, or for any other desired purpose, from static pressure shaft 42. Accordingly, that shaft may be connected directly to computer input shaft 17, as typically represented in the figure.

The invention further provides an improved manner of correcting an indicated differential pressure signal for static defect. The resulting true differential pressure signal may be supplied to computer 10, or employed for any desired purpose. Typical normal mechanism for supplying differential pressure information to computer 10 comprises the differential pressure transducer 70 for developing on the line 76 an electrical voltage signal representing differential pressure, and the servo control 80 for driving the shaft 82 in accordance with that signal. Transducer 70 typically comprises the capsule 72, which is mounted in chamber 73 and supplied internally with indicated static pressure from conduit 22 and externally with Pitot pressure from conduit 26. Capsule 72 is drivingly connected to the brush of a potentiometer 74, the winding of which is connected between ground and a source of reference voltage E. The brush voltage is supplied directly to the output line 76. That voltage is typically proportional to what may be called indicated differential pressure, since it represents the difference between total pressure and indicated static pressure.

That voltage signal on line 76 is supplied to servo control 80 and is compared by the comparison device 88 with a signal supplied over the line 86 from the balance potentiometer 84. The resulting difference signal is supplied via the line 89 as control signal to amplifier 90 for control of the motor 92. That motor drives an output shaft, indicated schematically at 82, which in turn drives the brush of potentiometer 84. With linear elements throughout, the mechanism as thus far described typically drives shaft 82 in direct proportion to the value of the indicated differential pressure.

In order to correct the action of such mechanism for static defect, the present invention employs at 88 an adding device adapted to produce on line 89 a voltage proportional to the voltage on line 76 minus the sum of the respective voltages on line 86 and on an additional input line 100. The signal on that line is derived by the comparison device 102, and is proportional to the difference between the voltage already described on line 46 and a voltage developed for the present purpose on the line 106 by the potentiometer 104. The winding of that potentiometer is connected between ground and a source of reference voltage E, and its brush is connected to line 106 and driven in proportion to the movement of true static pressure shaft 42. Hence the voltage on line 106 represents true static pressure, and the difference voltage on line 100 represents the difference between that pressure and the indicated static pressure, and consequently represents directly the static defect. Subtraction of that voltage from the indicated differential voltage signal on line 76 therefore corrects the latter signal for the static defect error that it contains. Accordingly, the servo control signal on line 89 is zero only when the signal tapped from potentiometer 84 correctly represents true differential pressure; and output shaft 82 is correctly driven by the servo in accordance with that quantity. That shaft may therefore be connected directly to computer input shaft 19, as indicated in the drawing, to supply true differential pressure information to the computer.

The described type of system is capable of providing fully accurate correction of static defect when the output 15 from computer 10 is proportional Mach number. When that output represents true airspeed there is a small residual error at certain values of ram temperature. However, that error may be substantially eliminated if desired by adding further components to the system, and is, in any case, very small compared to the original static defect itself, and may therefore be neglected for most purposes.

When the reference voltages represented as E are alternating-current voltages, as is required in the case of transformer 62, it may be desirable to provide means of known type for adjusting the relative phase of the various signals, as well as to maintain suitable proportionality between those signals. Impedance isolating means, such, for example, as cathode follower amplifier stages, are also well known, and may be provided as may be desired to prevent undesirable interaction of the various signals.

I claim:

1. In a system for producing a representation of true static pressure, the combination of means directly driven by pneumatic pressure derived from a static pressure orifice and producing an electrical input signal proportional to indicated static pressure; servo followup means comprising a movable static pressure member, dividing means responsive to a reference signal and acting to produce an electrical output signal equal to a variable fraction of the reference signal, said dividing means being drivable to vary the value of said fraction, and servo means for driving the static pressure member and the dividing means in synchronism to maintain the output signal from the dividing means equal to said input signal; means producing a voltage signal proportional to the ratio of indicated static pressure to true static pressure, and means for supplying the control signal as reference signal to the dividing means, whereby the position of said static pressure member represents true static pressure.

2. In a system for producing a representation of true static pressure, the combination of means directly driven by pneumatic pressure derived from a static pressure orifice and producing a voltage signal proportional to indicated static pressure; servo followup means comprising a movable static pressure member, a balance potentiometer having its brush driven with the static pressure member and having its winding connected between ground and a reference voltage, and servo means for driving the static pressure member and the balance potentiometer to maintain the voltage at the potentiometer brush equal to said voltage signal; means producing a voltage proportional to the ratio of indicated static pressure to true static pressure, and means for supplying said voltage as reference voltage to the balance potentiometer, whereby the position of said member represents true static pressure.

3. In a system for computing airspeed of an aircraft or the like, the combination of means directly driven by pressure derived from a static pressure orifice and producing a voltage signal proportional to indicated static pressure; servo followup means comprising a movable static pressure member, a balance potentiometer having its brush driven with the static pressure member and having its winding connected between ground and a reference voltage, and servo means for driving the static pressure member and the balance potentiometer to maintain the voltage at the potentiometer brush equal to said voltage signal; means for developing a signal representing differential pressure, computing means responsive to the last said signal and to the position of said static pressure member and acting to compute airspeed; and means acting under control of the computing means to modify the value of said reference voltage in direct proportion to the ratio of indicated static pressure to true static pressure, whereby the position of said member represents true static pressure.

4. The combination defined in claim 3, and wherein said means for developing a signal representing differential pressure comprises means producing a second voltage signal proportional to indicated differential pressure, a second potentiometer having its brush driven with said static pressure member and its winding connected between ground and a fixed reference voltage, means for correcting the second voltage signal by an amount proportional to the difference between the voltages at the brushes of said two potentiometers, second servo follow-up means comprising a movable differential pressure member and means for driving that member in direct proportion to the corrected second voltage signal, whereby the position of the differential pressure member constitutes a signal representing true differential pressure.

References Cited in the file of this patent

UNITED STATES PATENTS

| | | |
|---|---|---|
| 2,944,736 | Elms et al. | July 12, 1960 |
| 2,985,012 | Wail | May 23, 1961 |
| 3,002,382 | Gardner | Oct. 3, 1961 |

UNITED STATES PATENT OFFICE
CERTIFICATE OF CORRECTION

Patent No. 3,090,229            May 21, 1963

Robert Charles Howard

It is hereby certified that error appears in the above numbered patent requiring correction and that the said Letters Patent should read as corrected below.

Column 4, line 32, for "the control signal" read -- said voltage signal --.

Signed and sealed this 10th day of December 1963.

(SEAL)
Attest:
ERNEST W. SWIDER

Attesting Officer

EDWIN L. REYNOLDS

Acting Commissioner of Patents